May 21, 1935.  G. G. SABINS  2,001,942
SEPARABLE FASTENER
Filed March 30, 1934
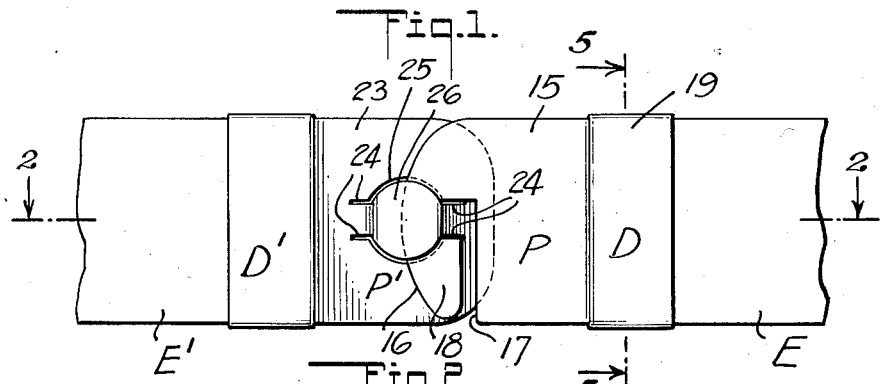
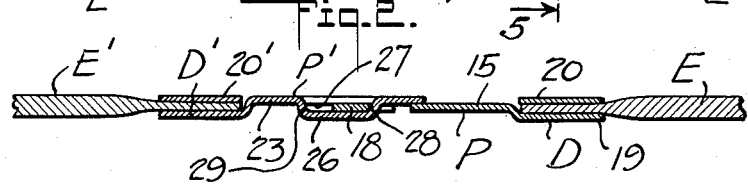
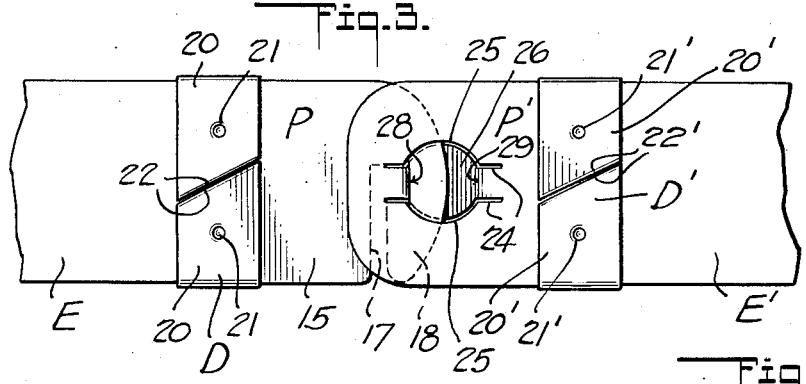
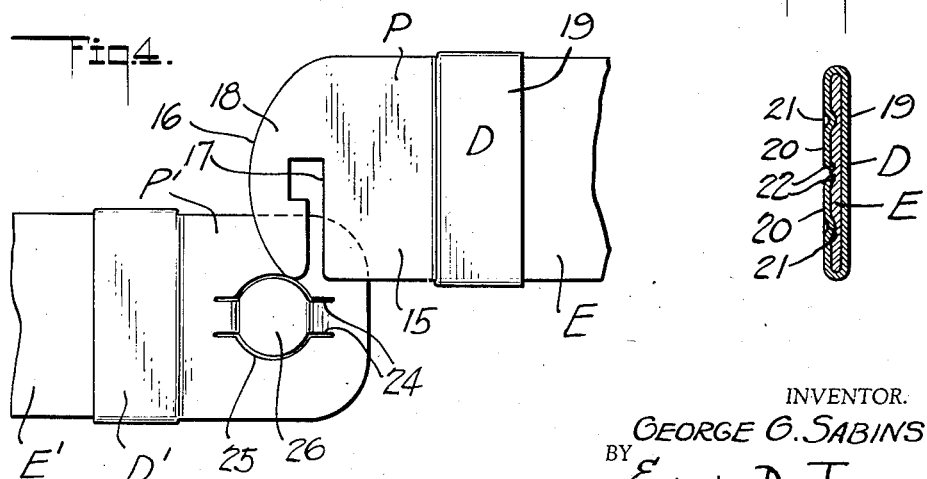
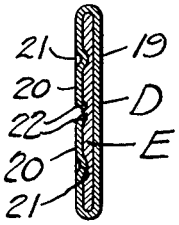
INVENTOR.
GEORGE G. SABINS
BY Edwin D. Jones
ATTORNEY Patented May 21, 1935

2,001,942

UNITED STATES PATENT OFFICE 2,001,942

SEPARABLE FASTENER

George G. Sabins, Glendale, Calif., assignor to Samuels-Kleiner, Ltd., Los Angeles, Calif., a corporation of California Application March 30, 1934, Serial No. 718,151

9 Claims. (Cl. 24—226)

My invention relates to separable fasteners and it has particular reference to fasteners as used on brassières and similar foundation garments for detachably connecting to each other the confronting ends of the two part elastic strap of the garment.

Heretofore, the conventional form of hook and eye fastener has been employed for this purpose, which renders it necessary not only to sew the parts of the fastener to the respective ends of the strap, but also to sew the binding material to the ends of the strap for preventing unraveling of the strap ends. These sewing operations add materially to the cost of manufacture of the garment, but what is more objectionable is that the binding tape and the parts of the fastener coact to form a prominent protrusion or hump at the strap ends which is readily discernible beneath an outer garment, and, therefore, highly objectionable to the fair sex.

It is a purpose of my invention to provide a separable fastener of simple, inexpensive and durable construction which eliminates the objections above pointed out of the conventional hook and eye fastener by having a hook part, an eye part, and strap attaching devices therefor, all made of thin sheet metal, and the over-all thickness of which does not exceed that of the strap so that no prominent protrusions or humps are presented, and thus when the fastener is worn beneath the thinnest of garments, it is invisible.

It is also a purpose of my invention to provide a separable fastener as above characterized which is capable of being easily manipulated to fasten or unfasten the strap ends, and when fastening the strap ends to utilize the elasticity of the strap to prevent the accidental unfastening thereof.

I will describe only one form of separable fastener embodying my invention, and will then point out the novel features thereof in claims.

In the accompanying drawing:

Fig. 1 is a view showing in front elevation one form of separable fastener embodying my invention with the two parts thereof in fastened position and attached to the confronting ends of a two part elastic strap.

Fig. 2 is a longitudinal sectional view taken on the line 2—2 of Fig. 1.

Fig. 3 is a view similar to Fig. 1 but showing the fastener in rear elevation.

Fig. 4 is a view similar to Fig. 1 but showing the fastener parts in unfastened position.

Fig. 5 is a sectional view taken on the line 5—5 of Fig. 1.

In carrying out my invention, I provide a separable fastener comprising a hook part P, an eye part P', and devices D and D' for the respective fastener parts designed for the purpose of permanently attaching such parts to the confronting ends E and E' of a two part elastic strap such as used on brassières for holding the latter in proper position on the body.

The hook part P and its attaching device D are made of a single sheet of thin metal shaped and bent as illustrated. The hook part P comprises a flat body 15 having a rounded edge 16 at its free end, and an inverted L-shaped slot 17 so formed therein that the free end of the body constitutes a hook 18.

The attaching device D comprises a flat body 19 which is formed integral with the body 15 but slightly offset therefrom as best illustrated in Fig. 2, and a pair of fingers 20 extended from opposite ends of the body and so bent as to be disposed at one and the same side of the body, but spaced therefrom to receive the respective strap end E. The strap end E is permanently secured within the device D by pressing the body and fingers together until the strap is securely gripped. The possibility of the strap being pulled from the device is eliminated by the provision of protuberances 21 formed by instriking the fingers at suitable points, and the provision of diagonal tongues 22 on the diagonal ends of the fingers, as best shown in Fig. 5. It will be understood that the protuberances and tongues bite into the strap and thus prevent its withdrawal so that the attaching device serves to permanently secure the hook part P to the strap end E.

The eye part P' and the corresponding attaching device D' are also constructed from a single sheet of thin metal shaped and bent as illustrated. The eye part P' comprises a flat body 23 slit along parallel lines 24 and curved lines 25 and then outstruck to form a disk shaped head 26 disposed at the front side of the body and spaced therefrom to provide a slot or eye 27 (Fig. 2) parallel to the plane of the body. In positioning the head 26 as described, abrupt shoulders 28 and 29 are formed on the edge of the head at diametrically opposed points.

The attaching device D' is of the same construction as the device D. Similarly, the device D' is formed integral with the eye part P', and the fingers thereof are adapted to be pressed toward the body for securing the strap end E' between the fingers and the body and to thus maintain the eye part permanently connected to the strap end. The parts of the device D', corresponding to like parts of the device D, are designated in the drawing by the same reference characters, except prime exponents have been added.

With the hook and eye parts of my fastener secured to the respective ends of the strap as described, the interengagement of the fastener parts to fasten one strap part to the other, can be easily effected by positioning the hoop part P above and parallel to the eye part P', in the manner illustrated in Fig. 4, so that the free end of the hook 18 is in position to be introduced into the upper end of the eye 27, that is, between the head 26 and the body 23. By now moving the hook downward, its bill passes through the eye, the shoulder 28 passing upward through the vertical arm of the slot 17 and finally into the horizontal arm of the slot.

As it is necessary to stretch the elastic strap parts longitudinally in order to extend the hook 18 through the eye, it will be clear that when the hook part is released the contracting action of the strap parts will cause the two parts of the fastener to move longitudinally outward in opposite directions. This action causes the shoulder 28 to move along the horizontal arm of the slot 17 until it abuts the hook, when relative longitudinal movement of the fastener parts is checked.

Thus, with the fastener parts engaged as described, the hook 18 is secured against removal from the eye vertically by the shoulder 28, horizontally by the tension of the strap parts, and laterally by the head 26 in one direction and by the body 23 in the other direction. Manifestly, the fastener parts are now secured one to the other to prevent accidental unfastening of the strap parts, and even should the tension of the latter be relaxed the strap parts will remain fastened, for it will be clear that if the hook is moved horizontally its curved edge will abut the shoulder 29, and although the shoulder 28 is now in the vertical arm of the slot, an upward movement of the hook must be effected manually before it can be withdrawn from the eye. As such manual movement is necessary to effect withdrawal of the hook, it will be evident that accidental unfastening of the strap part is prevented even under the conditions described.

By reference to Fig. 2, it will be seen that the over-all thickness of the fastener parts and attaching devices is no greater than the thickness of the elastic strap, so that when the fastener is worn beneath the sheerest of outer garments, it will not present any protuberances or humps to the fabric of which the garment is formed, and thus the fastener is invisible. Obviously, the attaching devices eliminate the necessity of sewing the fastener parts to the strap parts, and the use of binding tape to prevent unraveling of the strap ends is likewise eliminated.

Although I have herein shown and described only one form of separable fastener embodying my invention, it is to be understood that various changes and modifications may be made herein without departing from the spirit of my invention and the spirit and scope of the appended claims.

I claim:

1. A separable fastener, comprising; one part having an eye and another part having a hook adapted to be extended through the eye for securing the parts to each other; and attaching devices for the respective hook and eye parts for securing them to the respective ends of a strap, each of said devices comprising a body having fingers with portions spaced therefrom to receive a strap end between the fingers and the body and bendable to clamp the strap, each of said fingers having on its free end a tongue adapted to bite into the strap.

2. A separable fastener, comprising; an eye part having a body, a head at one side of the body to form an intervening eye disposed in a plane paralleling the body; a hook part having a hook extendible through the eye to lie in a plane paralleling the plane of the body and head; and strap attaching devices, one for each fastener part fixed to and disposed in a plane offset with respect to the plane of said hook part and having a body provided with fingers with portions spaced therefrom to receive a strap end between the fingers and body, and bendable to clamp the strap between the body and fingers.

3. A separable fastener as embodied in claim 2, wherein the fingers have protuberances and diagonally positioned tongues adapted to bite into the strap.

4. A separable fastener, comprising; an eye part having a flat body with a portion projecting laterally therefrom to form an eye between the remainder of the body and said portion so as to have entrances at opposite edges of said portion; and a hook part having a body, an integral portion of which is so shaped as to form a hook extendible into said eye through said entrances.

5. A separable fastener, comprising; an eye part having a flat body slit along parallel and curved lines and adapted to be outstruck to form a head disposed at one side of the body and providing an intervening slot; and a hook part having a hook extendible through said slot.

6. A separable fastener, comprising; an eye part having a flat body including an integral head at one side thereof to form an intervening eye, and integral angular shoulders connecting the head to the body; and a hook part comprising an elongated flat body provided with a transverse slot forming a hook so shaped as to be extendible through said eye and to abut said shoulders for limiting relative movement longitudinally of said eye and hook parts.

7. A separable fastener, comprising; an eye part having a flat body including an integral head at one side thereof to form an intervening eye, and integral angular shoulders connecting the head to the body; and a hook part comprising an elongated flat body provided with an L-shaped slot the longer arm of which extends inward from one longitudinal edge of the body to permit the portion of the hook part to be extended transversely of the eye part and between said eye body and said head, and the eye part to be moved lengthwise to cause one of said shoulders to pass into the short arm of said slot.

8. A separable fastener, comprising; an eye part having a one piece elongated flat body outstruck adjacent one end and along the major axis thereof to form an eye extending transversely of the body, and a strap attaching device on the other end of said body; and a hook part comprising a one piece elongated flat body having a transverse slot therein adjacent one end thereof to allow a portion of said body to be extended transversely through said eye, and a strap attaching device on the other end of said body.

9. In a separable fastener, a hook part comprising an elongated flat body having a rounded end and a slot therein adjacent and extending longitudinally of said end, with the inner end of said slot provided with an offset portion.

GEORGE G. SABINS.